(12) United States Patent
Wilkerson, Jr.

(10) Patent No.: US 6,711,955 B1
(45) Date of Patent: Mar. 30, 2004

(54) ACCUFLATE

(76) Inventor: William Edwin Wilkerson, Jr., P.O. Box 438, Crewe, VA (US) 23930

(*) Notice: Subject to any disclaimer, the term of this patent is extended or adjusted under 35 U.S.C. 154(b) by 0 days.

(21) Appl. No.: 09/769,607

(22) Filed: Jan. 25, 2001

(51) Int. Cl.$^7$ .............................................. G01L 19/04
(52) U.S. Cl. ........................... 73/708; 73/700; 73/146; 340/442
(58) Field of Search .................... 73/146, 146.2, 73/146.3, 146.4, 146.5, 146.8, 37, 40, 48, 49; 137/228; 340/442, 445

(56) References Cited

U.S. PATENT DOCUMENTS

| | | | | |
|---|---|---|---|---|
| 4,875,509 A | * | 10/1989 | Da Silva | 116/266 |
| 4,998,438 A | * | 3/1991 | Martin | 137/228 |
| 5,158,122 A | * | 10/1992 | Moffett | 141/38 |
| 5,875,413 A | * | 2/1999 | Vinci | 702/91 |
| 5,913,241 A | * | 6/1999 | Ohashi et al. | 73/146.2 |
| 6,025,777 A | * | 2/2000 | Fuller et al. | 340/442 |
| 6,034,596 A | * | 3/2000 | Smith et al. | 340/445 |
| 6,293,297 B1 | * | 9/2001 | Maldonado et al. | 116/34 R |
| 6,304,610 B1 | * | 10/2001 | Monson | 375/259 |

* cited by examiner

*Primary Examiner*—Edward Lefkowitz
*Assistant Examiner*—Anore Allen
(74) *Attorney, Agent, or Firm*—John H. Thomas, P.C.

(57) ABSTRACT

Accuflate measures the temperature and pressure of a tire and by processing this information through an Allen Bradley Micrologix and comparing this information to the ambient air temperature and the recommended inflation pressure allows the operator to inflate the tire to a SET-POINT PRESSURE so that when the tire has cooled it will be at the recommended operating level. This "HOT-TIRE INFLATION" allows the operator the opportunity to accurately inflate tires during an operational day when the opportunity to inflate cold is not available.

5 Claims, 8 Drawing Sheets

ACCUFLATE

CROSS-REFERENCE TO RELATED APPLICATIONS

Figure 1:
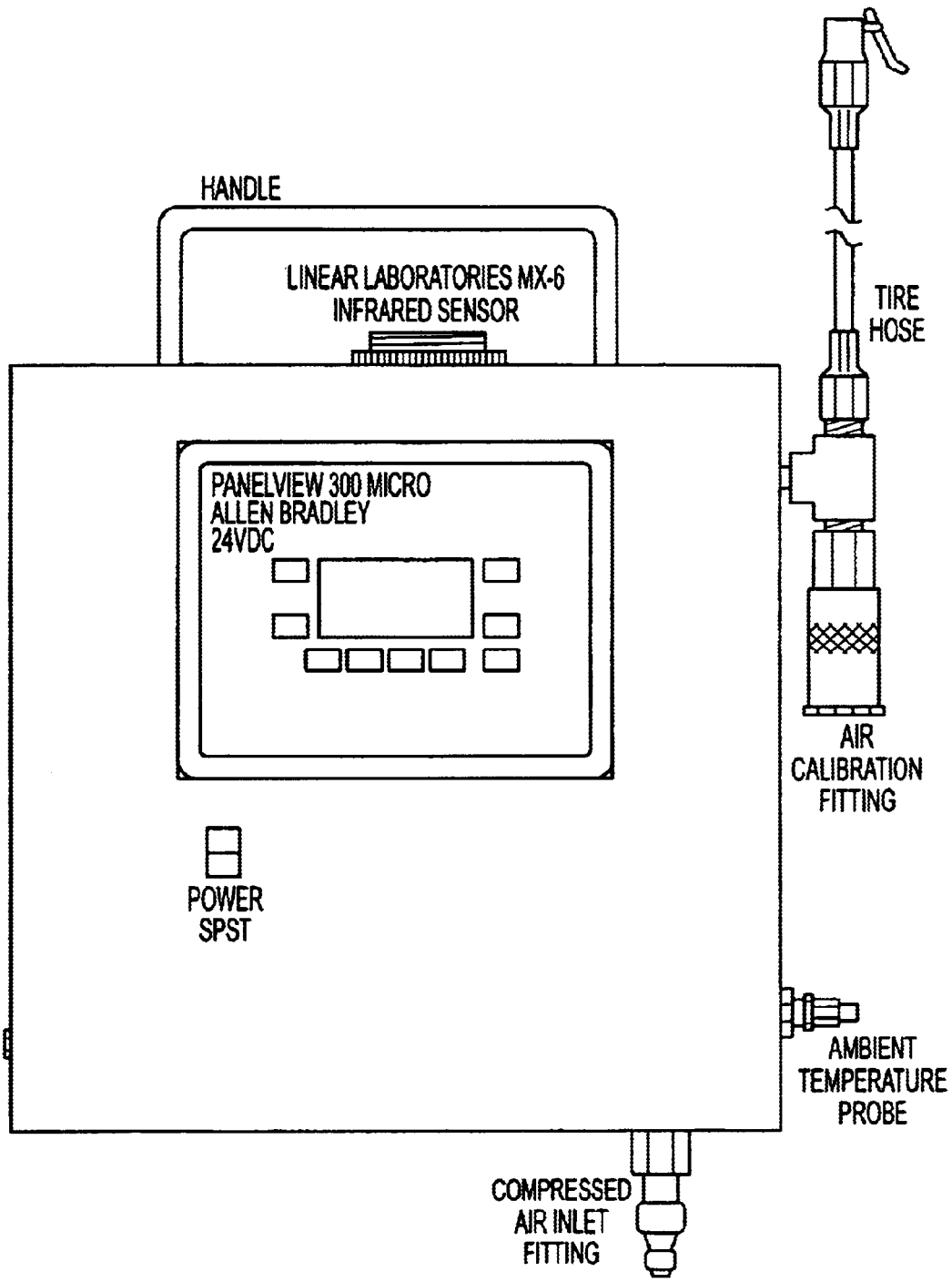

The ACCUFLATE device has been developed for the purpose of accurately inflating tires at any operational temperature as the standard for tire inflation is that the tire be in the cold state, which is the ambient air temperature. The ACCUFLATE allows "HOT-TIRE INFLATION" which means the operators would not have to wait for the tire to cool to properly inflate to the recommended pressure setting. There is no cross-reference as there are no other known efforts within the industry at this time for "HOT-TIRE INFLATION".

FEDERALLY SPONSORED RESEARCH OR DEVELOPMENT

The ACCUFLATE device has not been federally sponsored in any way.

REFERENCE TO MICROFICHE APPENDIX

There is no microfiche appendix.

BACKGROUND OF ACCUFLATE

We distrubute new aircraft tires and retread aircraft tires for the commuter and regional airline fleets in the United States and in many countries around the world. One of the problems that the airline operators have faced is the proper servicing of the tires.

The airline tires, which for the most part are tubeless, do not retain air pressure well as a five percent loss of pressure in a twenty-four hour period is acceptable. While this loss of pressure is acceptable it is also an industry standard that the airline not operate a tire more than five percent below the operating pressure. This means that the airline must inspect and service these tires every twenty-four hours.

This inspection and servicing has become complicated as the requirements for this inspection are based upon the tire being cold. The industry definition of cold is that the tire has not been used for at least two hours. With the present day operation of the airlines many of the aircraft remain overnight at out-stations where there is no maintenance service available so there is no means of servicing the tires before the first flight of the day while the tires are cold. The aircraft then will make an average of nine to eleven landings during the day with an average of thirty minutes on the ground prior to the next take-off. This means that there is no opportunity during the operational day to service the tires to the specified cold pressure setting.

Aircraft tires generate a great deal of heat during landing and taxi. As the heat increases, the pressure of the tire increases, and in turn, as the tire cools, the pressure decreases until the temperature of the tire is the same as the ambient, or outside air temperature. This cooling period is approximately two hours. The problem is that many of the operators did not have service capability before the first flight while the tires were cold, and then during the day, do not have the time between flights to allow the tires to cool two hours so as to be able to service the tires to the specification, which is inflation to ambient temperature.

The new generation of Regional Airline Jets operate tires that are quite dependent on proper inflation. With this in mind, we developed "ACCUFLATE" so the airline operators could inspect and service their tires at any time during the day as the "ACCUFLATE" reads the tire pressure, tire temperature, outside air temperature, then processes this information to determine the exact pressure for inflation so that the serviced pressure would be the same as if the tire was cold.

THE "ACCUFLATE" allows the operators to inflate their tires at any time, regardless of tire temperature, to the cold pressure specification.

BRIEF SUMMARY OF ACCUFLATE

The new generation of Regional Airline Jets operate tires that are quite dependent of proper inflation and have little tolerance to low pressure operation. Given the time restraints the airlines face the ACCUFLATE device would allow them the opportunity to service these tires properly as ACCUFLATE has the capability to service these tires, while at any temperature, to the cold pressure setting. This servicing, as allowed by ACCUFLATE, would greatly improve the reliability of these tires as well as improve the performance levels now offered by these tires.

The net result would be that the flying public would be on aircraft with properly inflated tires which means that the chance of a tire failure would be greatly reduced thereby greatly improving the reliability of these aircraft.

DESCRIPTION OF THE VIEW OF THE DRAWINGS

FIG. 1: ACCUFLATE FRONT VIEW

FIG. 2: ACCUFLATE ELECTRICAL LAYOUT

FIG. 3: ACCUFLATE ELECTRICAL DIAGRAM

FIG. 4: ACCUFLATE POWER SUPPLY AND MAJOR COMPONENT LAYOUT

FIG. 5: ACCUFLATE BACK-SIDE OF FRONT PANEL LAYOUT

FIG. 6: ACCUFLATE TEMPERATURE SENSOR/ TRANSMITTER LAYOUT

FIG. 7: ACCUFLATE PNEUMATIC LAYOUT

FIG. 8: ACCUFLATE PROGRAM SCREENS

DETAILED DESCRIPTION OF ACCUFLATE

The entire purpose for developing ACCUFLATE was to offer the operators a means by which they could properly inflate tires when the tires were at or above the ambient air temperature. This process is known as "HOT TIRE INFLATION". There are procedures by some of the tire manufacturers that allow averaging for this inflation but none of these are recognized by the aircraft manufacturers. At the present time there is no acceptable process nor device which allows the operator to inflate a hot tire to the cold specifications. With the above in mind we developed ACCUFLATE.

Figure 2:
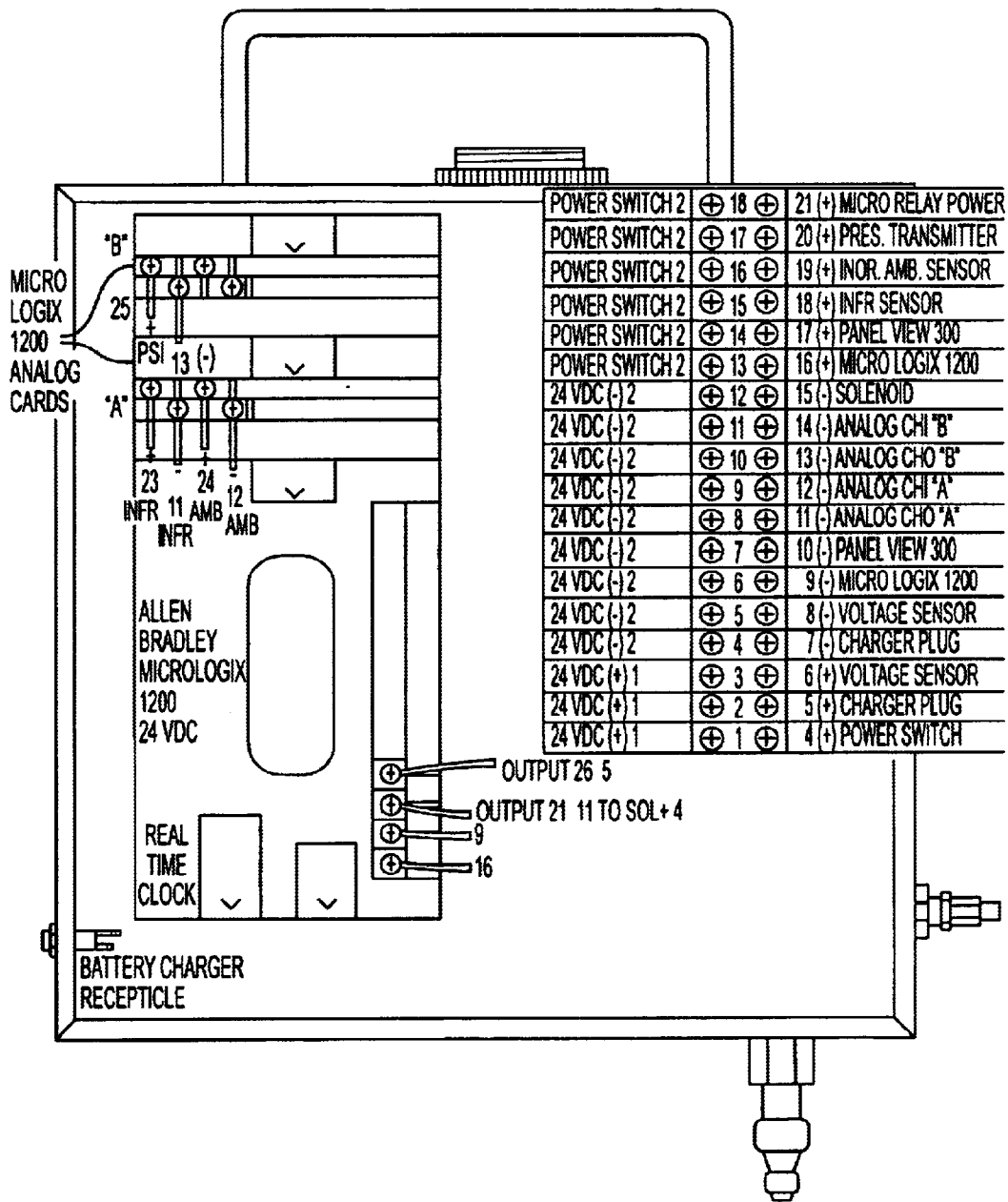

To accomplish this task we had to develop a device capable of not only taking the readings (temperature) but also have the capability of servicing the tire with air. FIG. 1 shouws the front view of ACCUFLATE and the major components. The air inlet supplies the service air (gas) while the tire hose attaches to the tire and is used to check the pressure of the tire as well as service. The Linear Laboratories MX-6 Infared Sensor is the source for the tire temperature and J-Type thermocouple is the source for the ambient air temperature. The service hose gives ACCUFLATE the pressure reading. All of this information is processed through the Allen Bradley Micrologix 1200 Analog Cards (FIG. 2) and the information displayed on the screen of the Allen Bradley Panel View 300 Micro 24DC.

Figure 4:
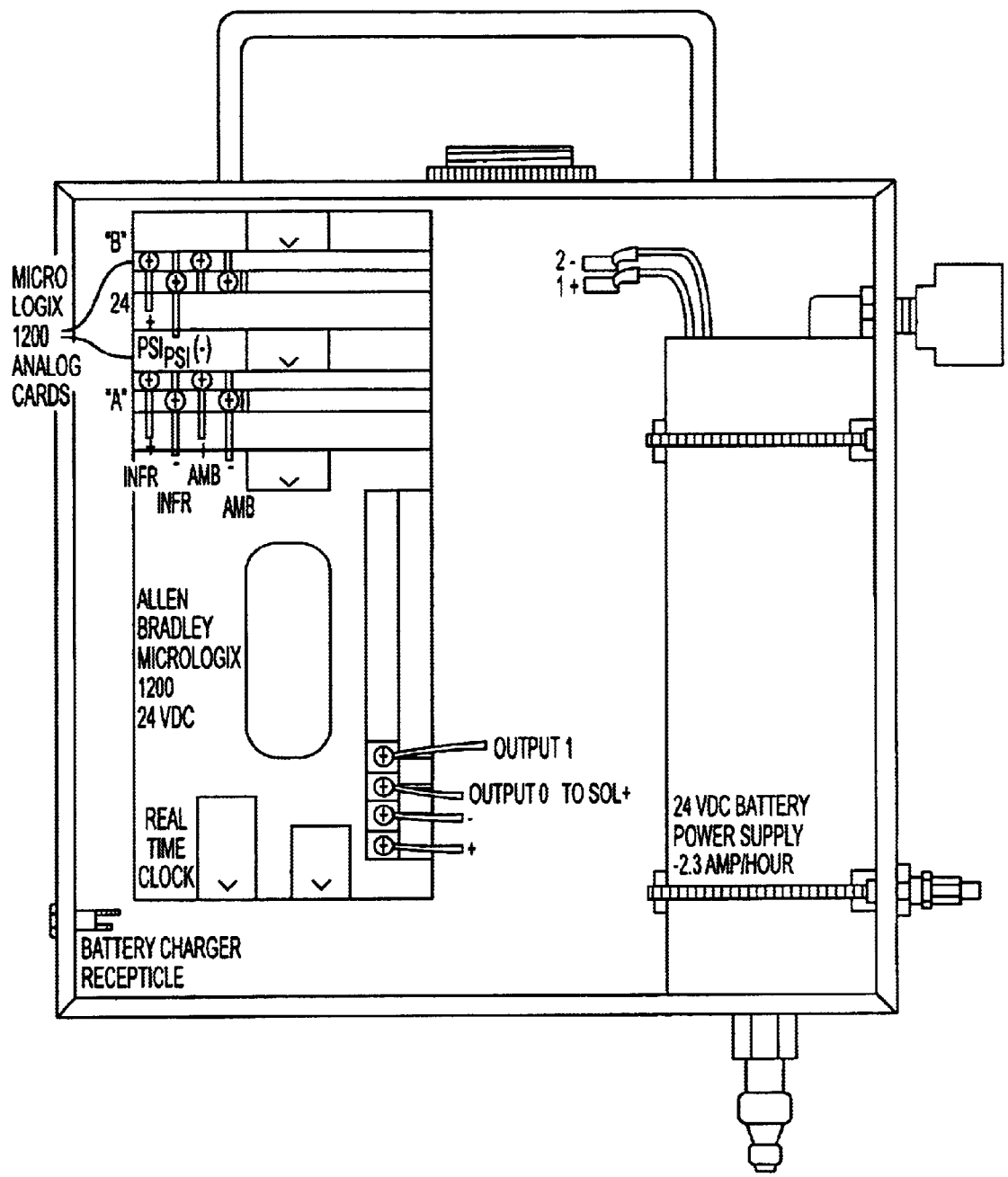
Figure 5:
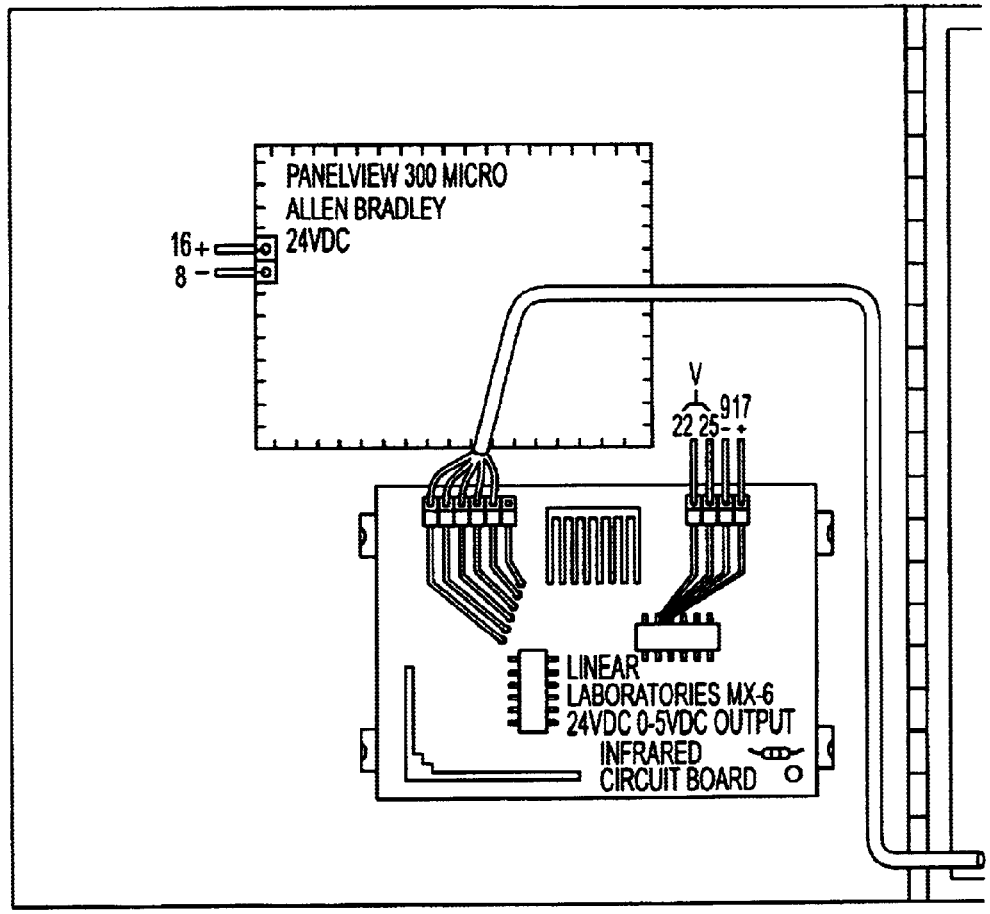
Figure 6:
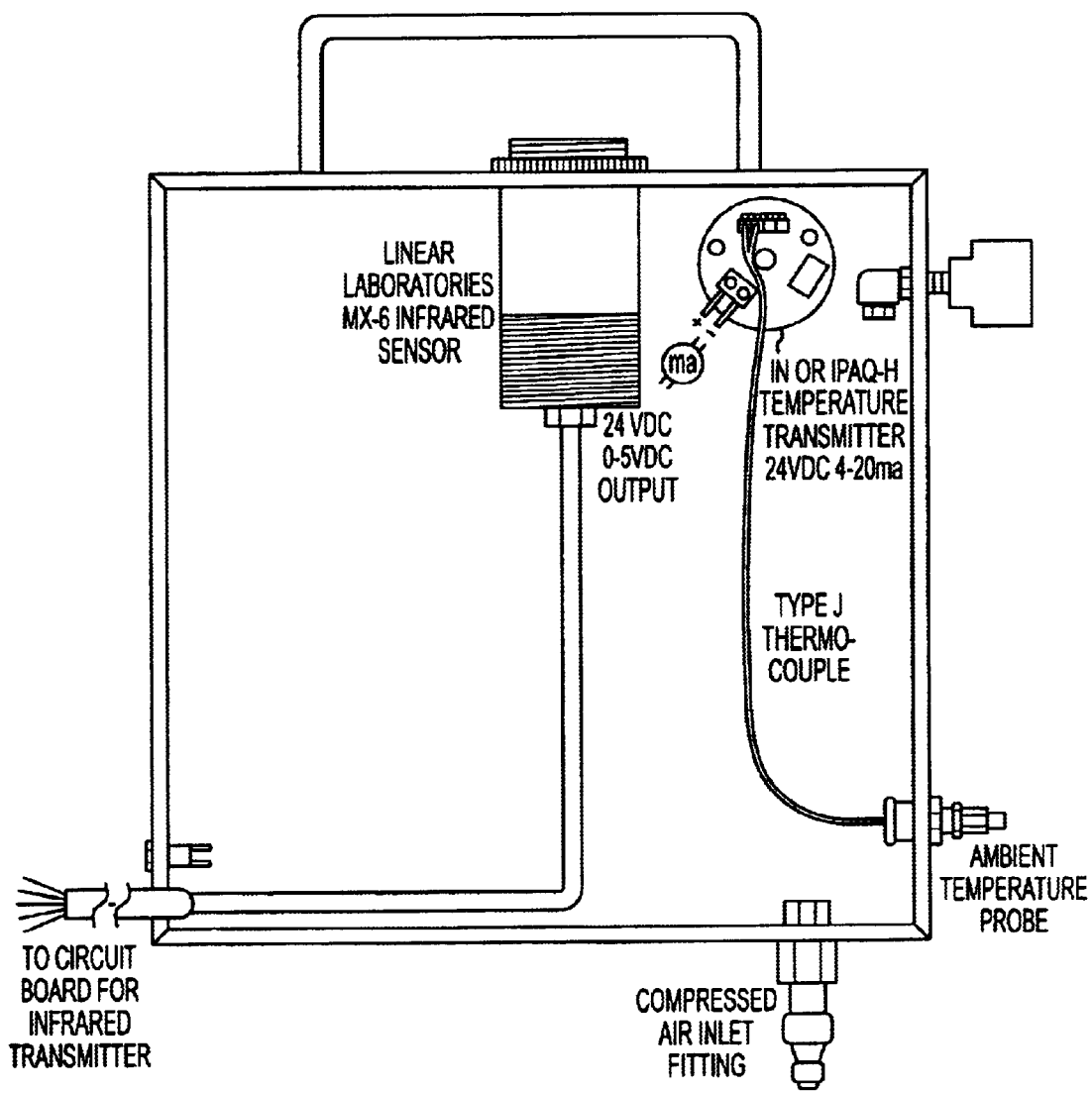

FIG. 6 shows the MK-6 Infared Sensor wired to the circuit board for the Infared Transmitter and the ambient air temperature probe wired to the Inor Temperature Transmitter. FIG. 4 shows the Pressure Transmitter (Dwyer 625-300) wired to the analog cards. From this, information processed through the Micrologix 1200 is then available to the screen, Allen Bradley Panelview 300 where the information is displayed. At this time the operator can instruct the device to inflate the tire to the computed inflation pressure at which time the information is sent to the PSI Transmitter (DWYER 625-300) as shown on FIG. 7 and air allowed to pass through to the tire via the ASCO Solenoid Valve. The screens as shown on FIG. 8 allow the operator a view of each stage of servicing and history of service.

Figure 3:
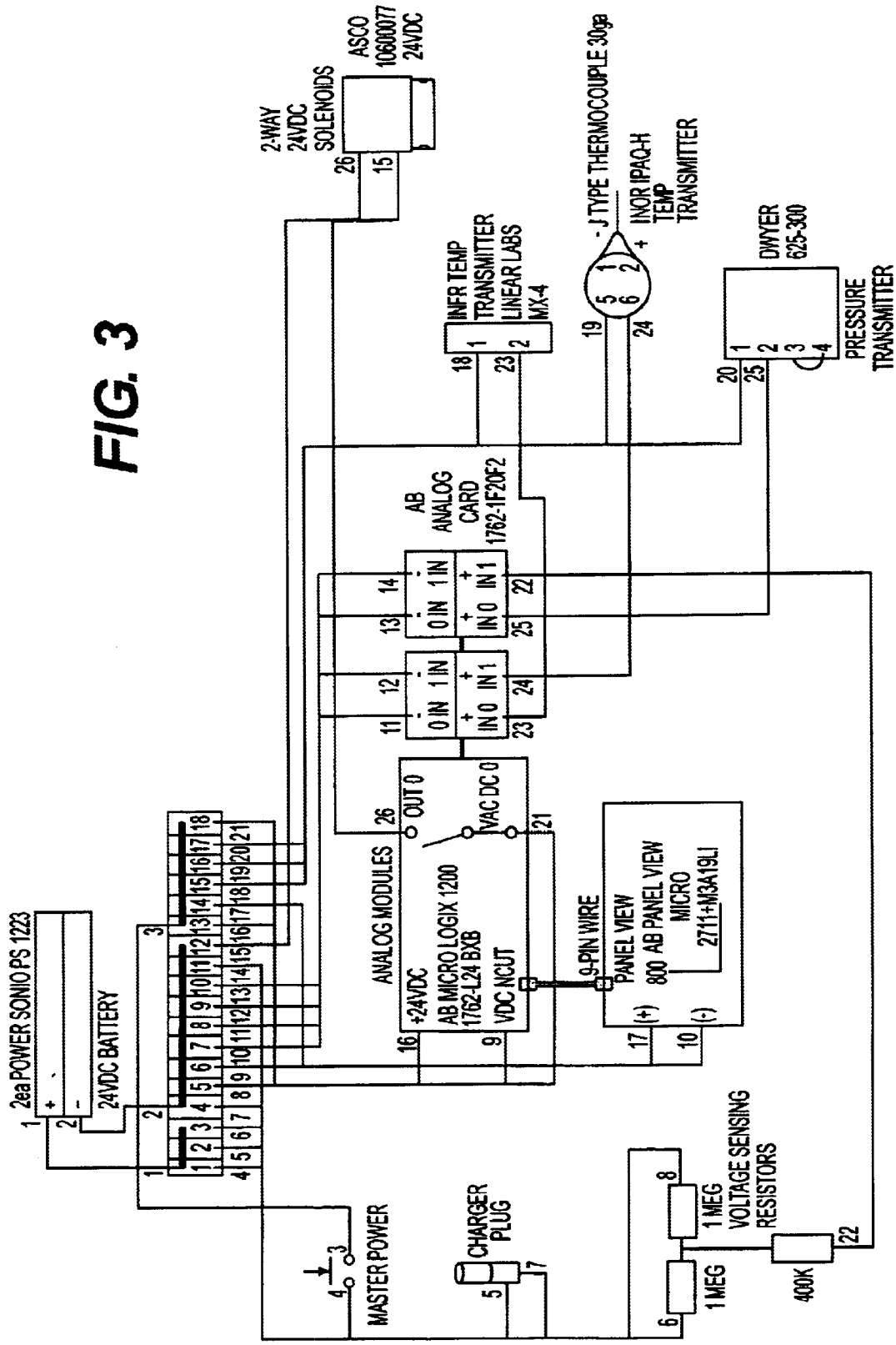

When utilized by an airline or operator the mechanic would power up the device by the toggle switch as shown on FIG. 1. There is a twenty second boot-up time before the screens become active per FIG. 8. The mechanic would then place ACCUFLATE beside the tire to be inflated so that the infared sensor is within eight to ten inches of the sidewall and pointing toward the sidewall of the tire. He would then attach the hose from ACCUFLATE to the tire valve. With the hose attached to the tire valve the pressure information is being processed to the Micrologix 1200 analog cards as shown on FIGS. 2, 3, and 7. With the ACCUFLATE powered-up the infared sensor is sending the tire temperature to the analog cards as per FIGS. 2, 3, and 6. The ambient temperature is reading the outside air temperature and sending this information to the analog cards per FIGS. 3, 4, and 6. When the operator prompts the Allen Bradley Panelview (FIG. 1) the screen will give him the information about the tire including tire temperature, ambient temperature, present pressure, the calibrated pressure (the pressure the tire is if the tire were ambient temperature), and the pressure the tire needs to be inflated to in order to be at operating pressure at ambient temperature which would be the same as a cold tire inflation. Then, if the ACCUFLATE has a supply line attached to the compressed air inlet fitting as shown on FIGS. 1, 2, 4, 6, and 7, the operator can prompt the Panelview and the ACCUFLATE will inflate the tire to the SET-POINT AIR PRESSURE which is the operating pressure allowing for the current temperature of the tire. The theory is that when the tire cooled it would be at the recommended operating pressure from this inflation.

The Allen Bradley Micrologix 1200 has been programmed to prompt the operator about the condition of the tire relative to the inflation check. These prompts are consistant with the industry standards. If the tire is found to be more than 5% below operating pressure, the operator is prompted to check the log book entries. If the tire is found to be more than 10% below operating pressure, the operator is prompted to remove the tire from the aircraft. If the tire is found to be greater than 20% below operating pressure, the operator is prompted to remove the tire and mate from the aircraft. All prompts follow the accepted industry standards.

Figure 7:
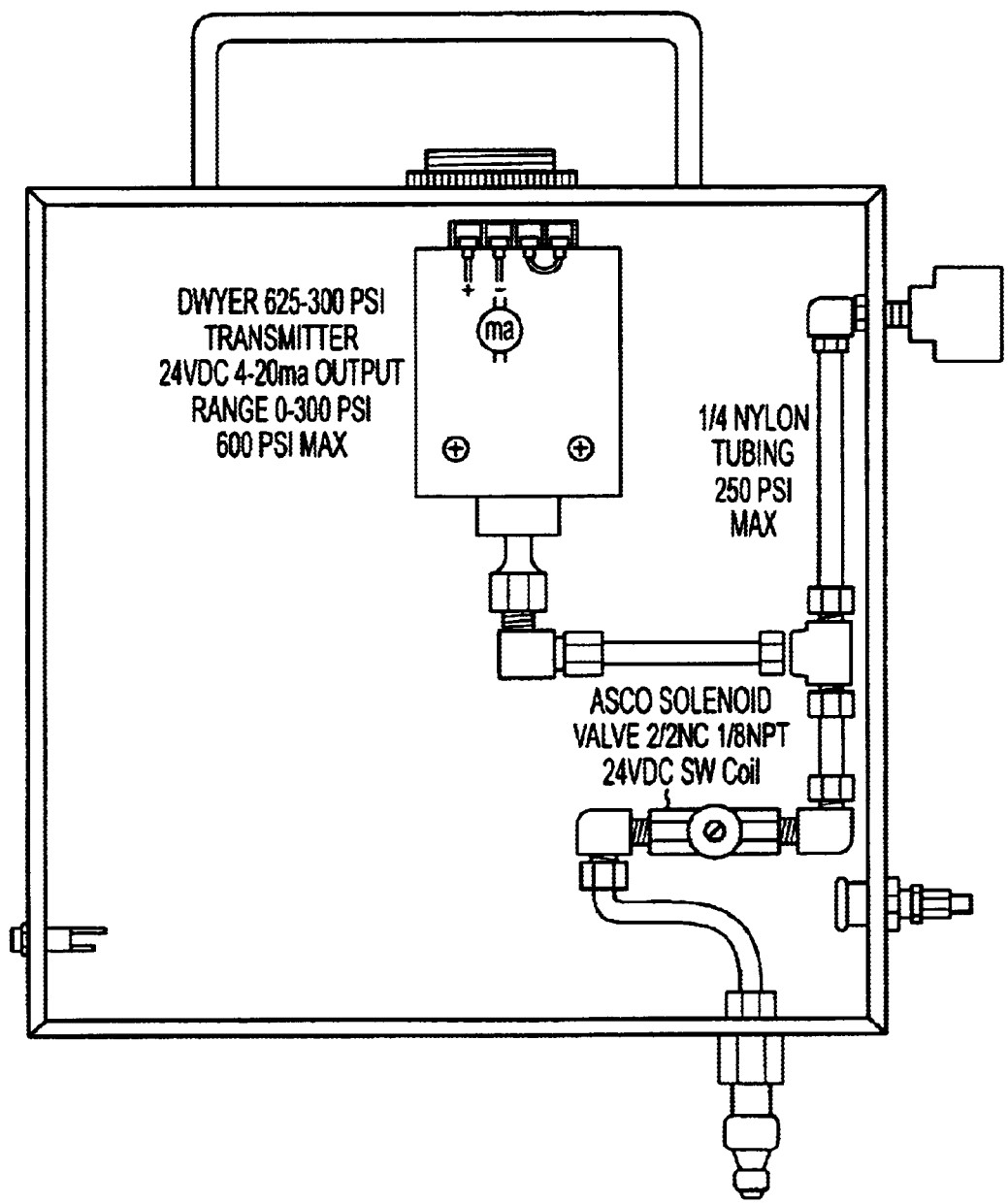
Figure 8:
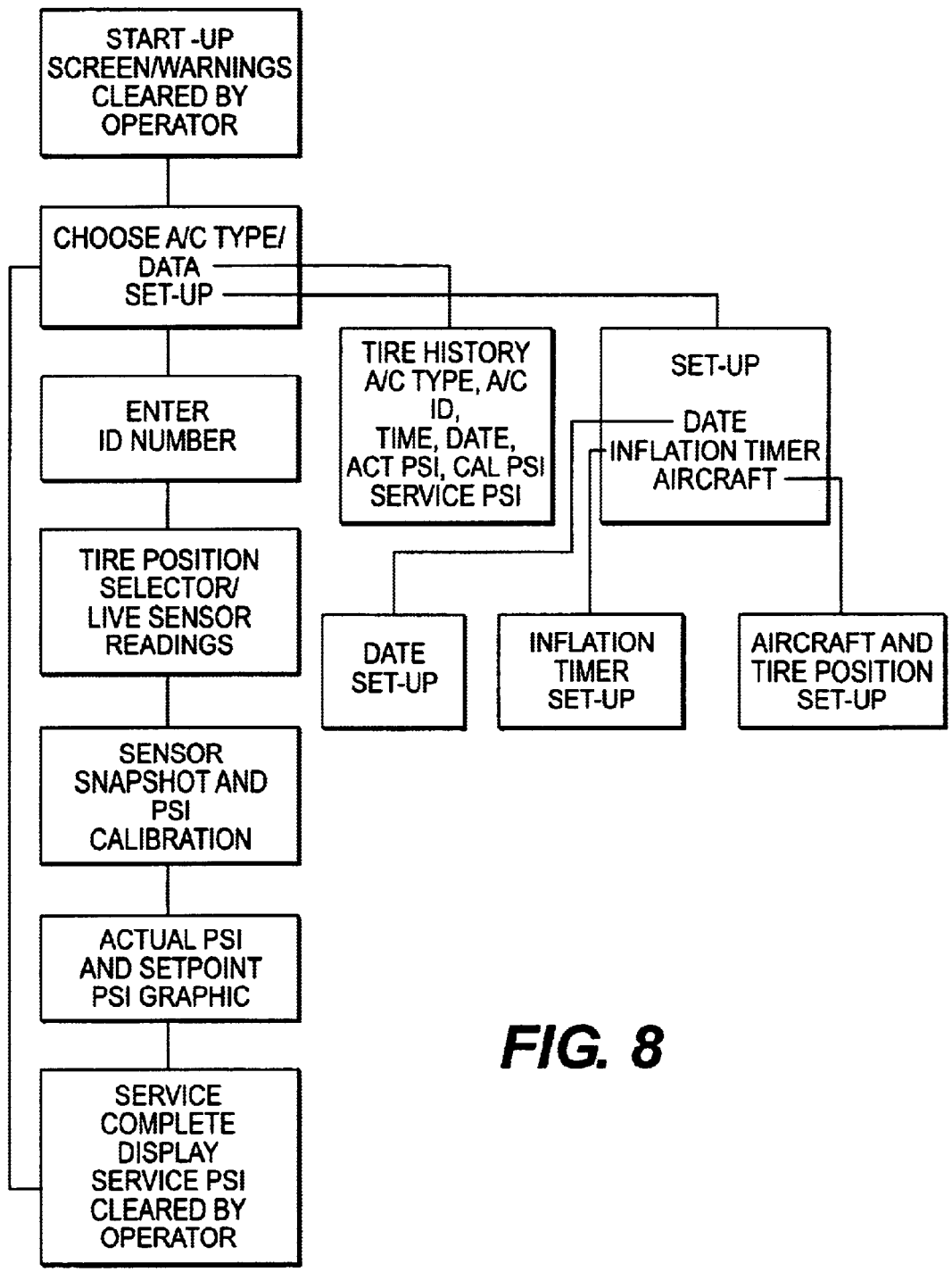

When the operator prompts ACCUFLATE to inflate the tire, the device obtains the inflation requirement from the Allen Bradley Micrologix 1200, reads the inflation setting from the PSI Transmitter, and supplies the pressure through the ASCO Solenoid Valve as shown on FIG. 7. When the pressure has reached the Set-Point Pressure, the ACCUFLATE will prompt the mechanic that the service has been completed per FIG. 8.

The Micrologix 1200 has also been programmed so that the mechanic can scroll to the tire positions and aircraft tail numbers in order to allow easy record keeping. The ACCUFLATE will record the most recent fifty readings and service history thus allowing the mechanic to return to his record room to properly document his inflation servicing. All of this is by screen prompts as shown on FIG. 8.

A complete OPERATOR'S MANUAL has been enclosed.

What is claimed is:

1. A portable device for measuring air pressure in a tire and for inflating the tire, the device comprising:

an air pressure gauge mounted on the portable device and adapted to measure air pressure in the tire;

an air hose mounted on the portable device and adapted to deliver air to the tire;

a first and second temperature sensor mounted on the portable device, the first sensor adapted to read tire temperature and the second sensor adapted to read ambient air temperature; and a processor connected to and adapted to receive information from the gauge, the hose and the sensors, adapted to compare the temperature and pressure of the tire with a recommended pressure at the ambient air temperature, and to instruct the hose to deliver air to the tire.

2. A device as described in claim 1, wherein the temperature sensor comprises an infrared sensor for reading the tire temperature.

3. A device as described in claim 1, wherein the processor is further adapted to store tire air pressure information.

4. A device as described in claim 1, wherein the processor further comprises sensor means for detecting an inflation error.

5. A method of monitoring and inflating a tire comprising the steps of:

providing an air pressure gauge, an air hose, temperature sensors and a processor connected to the gauge, hose and sensors, measuring the actual air pressure of the tire with the air pressure gauge, measuring both tire temperature and ambient temperature with the temperature sensors, calculating with the processor a recommended air pressure for the tire taking into account the tire temperature and actual air pressure, and inflating the tire using the air hose until the actual air pressure is the recommended air pressure.

* * * * *